United States Patent
Collier et al.

(10) Patent No.: US 9,785,650 B2
(45) Date of Patent: Oct. 10, 2017

(54) FLEXIBLE CONTENT DISPLAY

(71) Applicant: MICROSOFT CORPORATION, Redmond, WA (US)

(72) Inventors: Adrian Collier, Bellevue, WA (US); Katrina Mendoza, Seattle, WA (US); Srinivas Patnaik, Bothell, WA (US); William Scott Shown, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 548 days.

(21) Appl. No.: 14/192,084

(22) Filed: Feb. 27, 2014

(65) Prior Publication Data

US 2015/0242457 A1    Aug. 27, 2015

(51) Int. Cl.
*G06F 17/00* (2006.01)
*G06F 17/30* (2006.01)
*G06F 17/24* (2006.01)

(52) U.S. Cl.
CPC ...... *G06F 17/30256* (2013.01); *G06F 17/248* (2013.01); *G06F 17/30017* (2013.01); *G06F 17/30991* (2013.01); *G06F 17/30994* (2013.01)

(58) Field of Classification Search
None
See application file for complete search history.

(56) References Cited

U.S. PATENT DOCUMENTS

| | | | |
|---|---|---|---|
| 2004/0205609 A1* | 10/2004 | Milton | G06F 17/30867 715/248 |
| 2010/0017704 A1 | 1/2010 | Jaffe et al. | |
| 2011/0239105 A1 | 9/2011 | Veselov et al. | |
| 2012/0110437 A1 | 5/2012 | Pan et al. | |
| 2012/0272140 A1 | 10/2012 | Hanechak | |
| 2012/0278704 A1 | 11/2012 | Ying et al. | |
| 2013/0212487 A1 | 8/2013 | Cote | |
| 2013/0219263 A1 | 8/2013 | Abrahami | |
| 2013/0282894 A1* | 10/2013 | Barak | G06F 17/3089 709/224 |

OTHER PUBLICATIONS

"Using CSS Flexible Boxes", Published on: Aug. 26, 2013 Available at: https://developer.mozilla.org/en-US/docs/Web/Guide/CSS/Flexible_boxes.

* cited by examiner

*Primary Examiner* — Keith Bloomquist (74) *Attorney, Agent, or Firm* — Shook, Hardy & Bacon L.L.P.

(57) ABSTRACT

Methods, computer systems, and computer-storage media are provided for flexibly displaying content. Rather than associating content with templates without any account for the content itself, templates are associated with content items based on one or more of the content itself, a template class, and a screen size to display the content item.

13 Claims, 11 Drawing Sheets

FLEXIBLE CONTENT DISPLAY

BACKGROUND

Applications and/or web resources (e.g., websites) that desire to display dynamic content face the challenge of displaying the dynamic content in a visually appealing way in combination with editorially chosen content. The challenge appears when arranging content within templates where the templates may be designed for editorially chosen content but dynamic content, coming from outside sources, may not fit the rigid templates. Thus, layouts of the content may be arranged in an odd manner and not look good together.

Presently, content is arranged into rigid templates that are pre-made and not chosen based on content. Rather, content is made to fit the template. This results in sparse content display, gaps in the display, and little variability in displays.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer-storage media for, among other things, flexibly displaying content items. As mentioned, the present invention seeks to display dynamic content items in a visually pleasing manner. This is achieved by assigning templates to content items based on the content, a class associated with the content item, a screen size associated with a display device, and the like. As a result, templates are chosen based on content rather than content being forced into templates that do not work. Additionally, templates are chosen for subsequent content items based on the template chosen for previous content items and remaining screen size.

Accordingly, in one embodiment, the present invention is directed to one or more computer-storage media having computer-executable instruction embodied thereon that, when executed by one or more computing devices, perform a method. The method comprises receiving one or more content items to be displayed; identifying a class associated with a first content item of the one or more content items; validating the class associated with the first content item; based on the class associated with the first content item and a screen size to display the first content item, associating the first content item with a first template; validating any remaining content items of the one or more content items; associating each remaining content item with a template; and displaying the one or more content items within their respective templates in a content cluster.

In another embodiment, the presented invention is directed to a computerized method comprising receiving a first content item; validating a first class associated with the first content item; upon determining the first class associated with the first content item is invalid, associating the first content item with a second class different from the first class; based on the second class of the first content item and a screen size to display the first content item, associating the first content item with a first template; determining whether any content items remain to be displayed; validating a class associated with each remaining content item and associating each remaining content item with a template; determining whether any content items remain to be displayed; and upon determining there are no content items remaining to be displayed, displaying each content item within their respective template in a content cluster.

In yet another embodiment, the present invention is directed to one or more computer-storage media having computer-executable instruction embodied thereon that, when executed by one or more computing devices, perform a method. The method comprises receiving a plurality of content items; identifying a first content item and a first class associated therewith; validating the first class; upon validating the first class, associating the first content item with a template, wherein associating the first content item with a first template includes: determining whether the first content item includes an image greater than a predetermined size, and based on determining the first content item includes an image greater than a predetermined size, associating the first content item with a large item template to be displayed in a first item column; identifying whether one or more content items remain to be displayed; upon identifying there are one or more content items remaining to be displayed, adding one or more additional columns to display the one or more remaining content items; identifying that a maximum column count has been reached; based on identifying the maximum column count has been reached and there are one or more content items remaining to be displayed, adding a headline column; and displaying the first item column, the one or more additional columns, and the headline column in a content cluster.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-storage media for, among other things, flexibly displaying content items. As mentioned, the present invention seeks to display dynamic content items in a visually pleasing manner. This is achieved by assigning templates to content items based on the content, a class associated with the content item, a screen size associated with a display device, and the like. As a result, templates are chosen based on content rather than content being forced into templates that do not work. Additionally, templates are chosen for subsequent content items based on the template chosen for previous content items and remaining screen size.

At a high level, applications may request and/or receive content items from a database, which may be any online repository storing content items, and a content cluster may be created based on application requirements. Application requirements may be, for instance, that the content cluster is a boxed content cluster (i.e., content items are presented with boxed borders), unboxed content cluster (i.e., there are no boxes around content items), and the like. The content cluster may also be arranged based on available screen space. Content items may be associated with templates within the content cluster until there are no more content items to display or a maximum column count has been reached. The maximum column count may depend on the available screen space.

Templates may be selected for content items based on various factors including, but not limited to, presence of an image, size of an image, content image aspect ratio, title length, content length, abstract presence, snippet presence, template class, and the like. Once all content items have been associated with a template, the set of content items is displayed within the content cluster.

Having briefly described an overview of embodiments of the present invention, an exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one or combination of components illustrated.

Embodiments of the invention may be described in the general context of computer code or machine-useable instructions, including computer-useable or computer-executable instructions such as program modules, being executed by a computer or other machine, such as a personal data assistant, a smart phone, a tablet PC, or other handheld device. Generally, program modules including routines, programs, objects, components, data structures, and the like, refer to code that performs particular tasks or implements particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network. In a distributed computing environment, program modules may be located in both local and remote computer storage media including memory storage devices.

Figure 1:
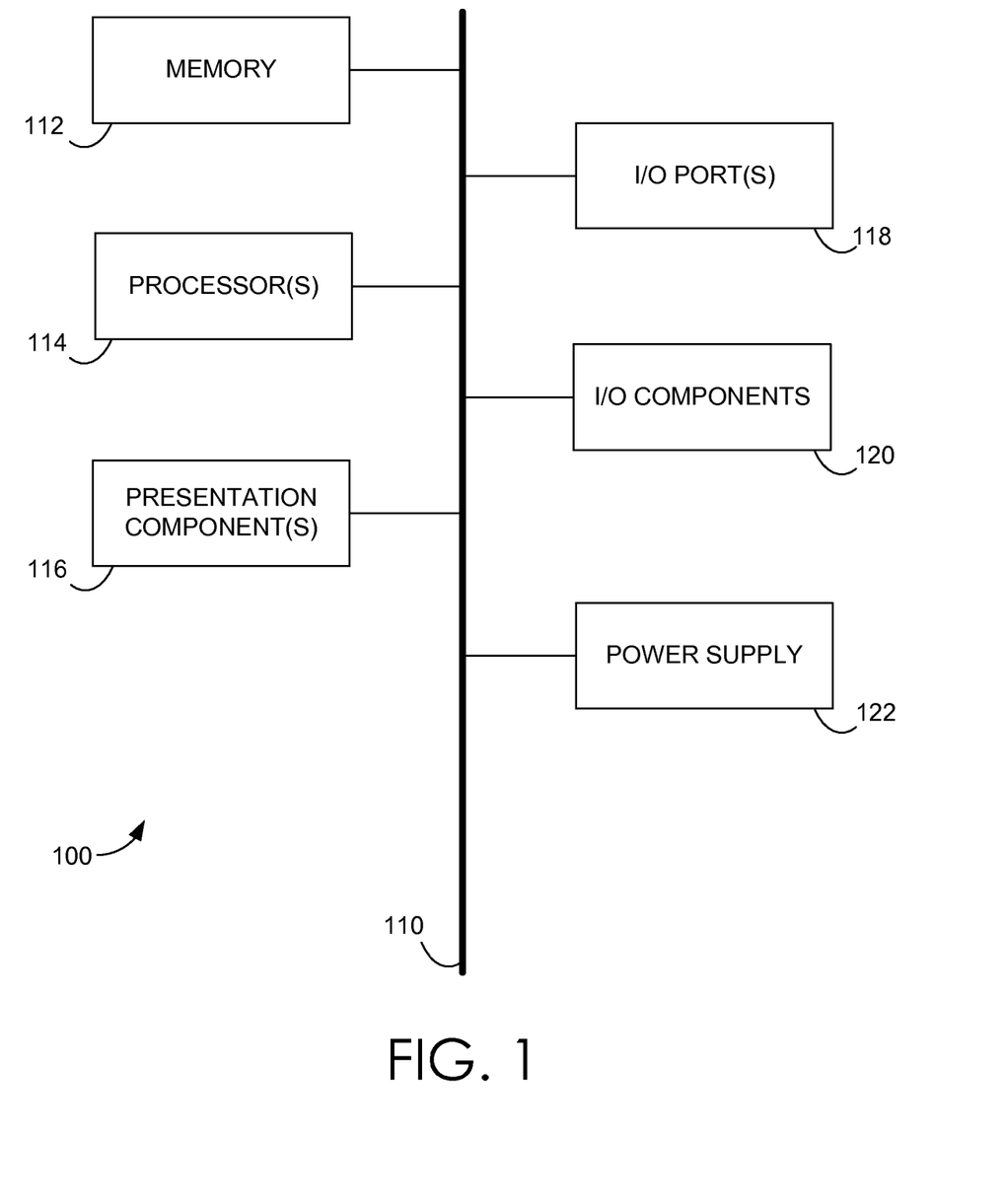
FIG. 1 is a block diagram of an exemplary computing environment suitable for use in implementing embodiments of the present invention.

With continued reference to FIG. 1, the computing device 100 includes a bus 110 that directly or indirectly couples the following devices: a memory 112, one or more processors 114, one or more presentation components 116, one or more input/output (I/O) ports 118, one or more I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media may be any available media that is accessible by the computing device 100 and includes both volatile and nonvolatile media, removable and non-removable media. Computer-readable media comprises computer storage media and communication media; computer storage media excludes signals per se. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative I/O components include a microphone, joystick, game pad, satellite dish, scanner, printer, wireless device, a controller, such as a stylus, a keyboard and a mouse, a natural user interface (NUI), and the like. An NUI processes air gestures, voice, or other physiological inputs generated by a user. These inputs may be interpreted as search prefixes, search requests, requests for interacting with intent suggestions, requests for interacting with entities or subentities, or requests for interacting with advertisements, entity or disambiguation tiles, actions, search histories, and the like presented by the computing device 100. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as, stereoscopic camera systems, infrared camera systems, RGB camera systems, and combinations of these for gesture detection and recognition. Additionally, the computing device 100 may be equipped with accelerometers or gyroscopes that enable detection of motion. The output of the accelerometers or gyroscopes is provided to the display of the computing device 100 to render immersive augmented reality or virtual reality.

Aspects of the subject matter described herein may be described in the general context of computer-executable instructions, such as program modules, being executed by a computing device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term "server" is often used herein, it will be recognized that this term may also encompass a search engine, a Web browser, a cloud server, a set of one or more processes distributed on one or more computers, one or more stand-alone storage devices, a set of one or more other computing or storage devices, a combination of one or more of the above, and the like.

Figure 2:
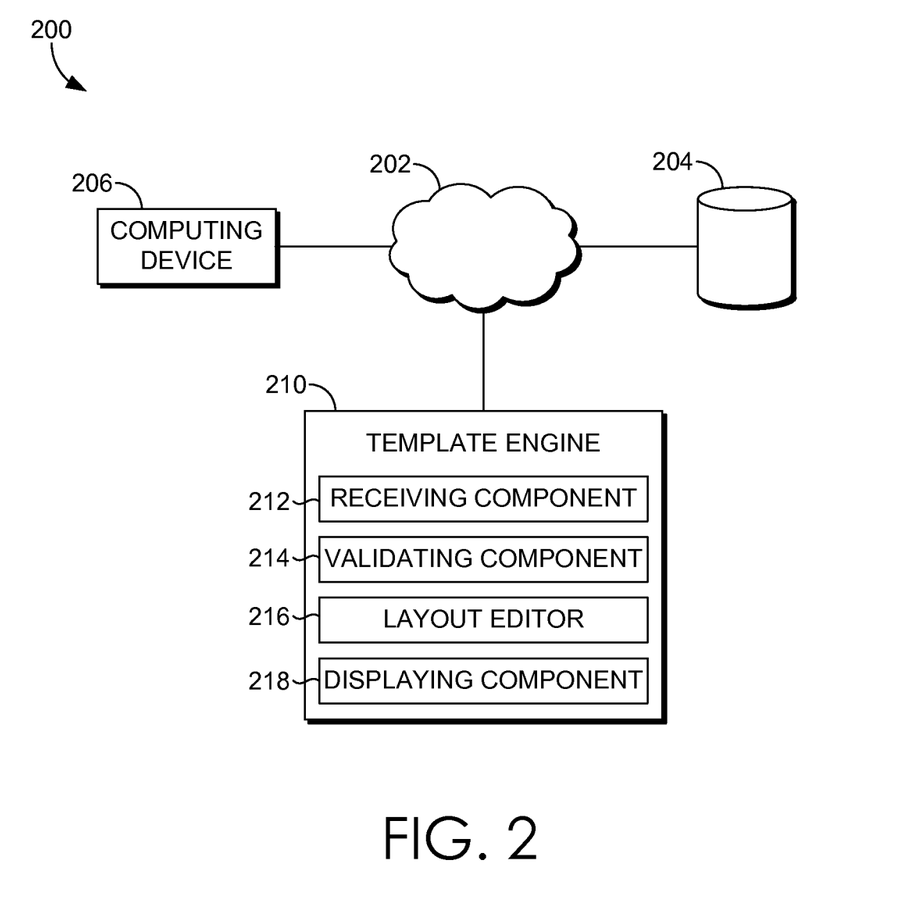
FIG. 2 is a block diagram of an exemplary system for flexibly displaying content items suitable for use in implementing embodiments of the present invention.

Referring now to FIG. 2, a block diagram is provided illustrating an exemplary computing system 200 in which embodiments of the present invention may be employed. Generally, the computing system 200 illustrates an environment where content items are assigned to templates.

Among other components not shown, the computing system 200 generally includes a network 202, a database 204, a computing device 206, and a template engine 210. The network 202 may include, without limitation, one or more local area networks (LANs) and/or wide area networks (WANs). Such networking environments are commonplace in offices, enterprise-wide computer networks, intranets and the Internet. Accordingly, the network 202 is not further described herein.

The database 204 may be any database storing content items. As such, the database 204 may be an online repository of content items. The database 204 may be accessible by entities submitting content items, entities developing content clusters, and the like.

The template engine 210 may be any device capable of implementing the present invention. The template engine 210 may be configured to, for example, flexibly display content items. The template engine 210 may include a receiving component 212, a validating component 214, a layout editor 216, and a displaying component 218, among other components.

The receiving component 212 may be configured to, among other things, receive content items. The content items may be received from any source. Content items may be dynamic content items or editorially chosen content items. Dynamic content items, as used herein, refers generally to content items that are created by an entity other than the entity displaying the content item in a content cluster. Editorially chosen content items, as used herein, refer generally to content items that are chosen and edited by the entity displaying the content item in the content cluster. Thus, is may be edited according to various business rules and the like associated with the entity displaying the content cluster while dynamic content items typically are not edited according to those rules and may need more flexibility regarding templates.

The validating component 214 may be configured to, among other things, validate content items. In particular, the validating component 214 is configured to validate a template class, if any, associated with a content item. A template class, as used herein, refers generally to an identifier representing an indication of specific properties of a content item. Template classes may be defined, for example, based on whether an image is present, the size of the image, the orientation of the image, whether the content item is a video or slide show, and the like. For instance, template class A may indicate a content item with an image having a landscape orientation, template B may indicate a content item with an image having a portrait orientation, while template D may indicate a content item has no images, and the like.

Template classes may be assigned to editorially chosen content by the entities displaying the content cluster, as they are also choosing the editorially chosen content. As such, the validity of a template class for editorially chosen content is likely to be correct. However, mistakes can occur so a template class is still validated for editorially chosen content.

Template classes may also be assigned by entities other than the entity displaying the content cluster. Dynamic content items, for example, are likely to be associated with a template class by the entity that created the dynamic content item. As with editorially chosen content, template classes may be mistakenly associated with dynamic content items. For instance, a dynamic content item may be associated with template class A (landscape image) but not include an image at all. This is obviously an invalid template class. The validating component 214 identifies a template class and then verifies that the properties associated with the template class are fulfilled by the content item. For example, if a content item is associated with template class D it must not contain an image. However, if a content item contains an image it does not meet the requirements to be associated with template class D.

Additionally, content items may be received that are not associated with a template class at all. In this case, the validating component 214 would assign an appropriate template class to the content item rather than validating an existing template class.

Once validated, content items may be communicated to the layout editor 216. The layout editor 216 may be configured to, among other things, associate content items with templates. The layout editor 216 may evaluate a variety of factors including, but not limited to, template class, screen size, content properties including content length, title length, abstract presence, image size, and the like, to associate a content item with a template.

In an embodiment, the layout editor 216 identifies a template class associated with the content item. Each template class is associated with one or more templates. For instance, template class A may have 5 templates associated therewith and template class B may have 6 templates associated therewith, some of which may overlap. The layout editor 216 may then identify a screen size. The screen size may further narrow down available templates. From there, a layout is associated with the content item. This association may be random from the identified available templates (i.e., those identified as associated with the template class and satisfying the screen size requirements).

The identified available templates may be dynamically adjusted. A layout that is no longer available because, for instance, it was associated with a previous content item, may be removed from the identified available templates. Additionally, templates may be added to the identified available templates by, for instance, the layout editor 216, to increase the likelihood that it is the template chosen. For example, assume that a first content item is associated with a large item template. A large item template, as used herein, refers generally to a template requiring an image at least or greater than a predetermined size. Large item templates may only be used once in a content cluster. In that case, while evaluating a second content item, the layout editor 216 may remove the large item template, which may have been associated with the second content item as it, too, has an image at least or greater than a predetermined size. Additionally, the layout editor 216 may add a substitute template in place of the large item template. A substitute template may be identified based on template class. For instance, continuing on with the example above, it has been identified that the second content item includes an image of a predetermined size (or else the large item template would not have been an option to begin with) so the substitute template may be a template accommodating an image (rather than a template that does not include an image). Another instance may be that the large item template was used so a subsequent content item only has a certain amount of screen space available. Templates that will not comply with the available screen space may be removed while templates that could work with the available screen space may be added such that the likelihood that they are chosen is increased. In embodiments, templates are associated with a height, or number of pixels, and that is used relative to screen size in order to determine appropriately sized templates.

The layout editor 216 may continue associating content items with templates until (1) there are no content items left to display or (2) a maximum column count has been reached. A maximum column count indicates a maximum number of columns that may be displayed in a content cluster less one column. This may be determined by screen size, among other things. The maximum column count is "less one column" as a headline column is presented in content clusters. Thus, there are a maximum number of columns that may be presented so that the headline column still has room. A headline column, as used herein, refers generally to a portion of a content cluster including one or more templates that each includes the same information. In an embodiment, each template within the headline column includes an image, a headline, and a source (i.e., a source of the content item). A snippet, or short description of the article, may not be included. Embodiments of the invention validate template classes and associate content items with templates for each available content item prior to generating the content cluster.

Figure 5:
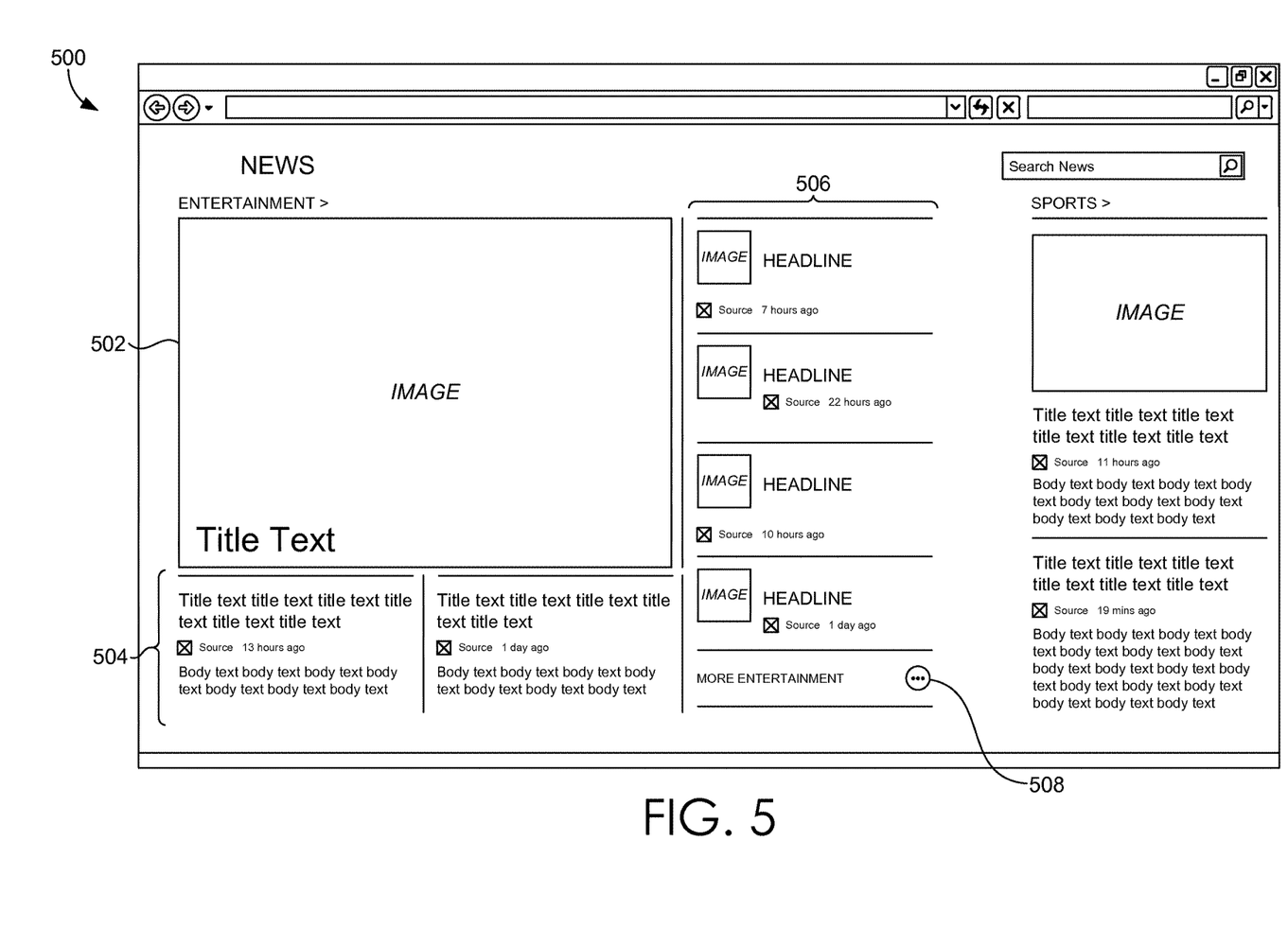
FIGS. 5-8 depict illustrative screen displays, in accordance with an embodiment of the present invention.

Once the layout editor 216 is complete, the displaying component 218 is configured for, among other things, displaying the content cluster. An exemplary content cluster is illustrated in FIG. 5 and will be discussed in greater detail below. As previously mentioned, the content cluster is not generated until each content item has been validated and associated with a template. Once validated and associated with a template, each content item is configured within their respective template and assembled within the content cluster.

Figure 3:
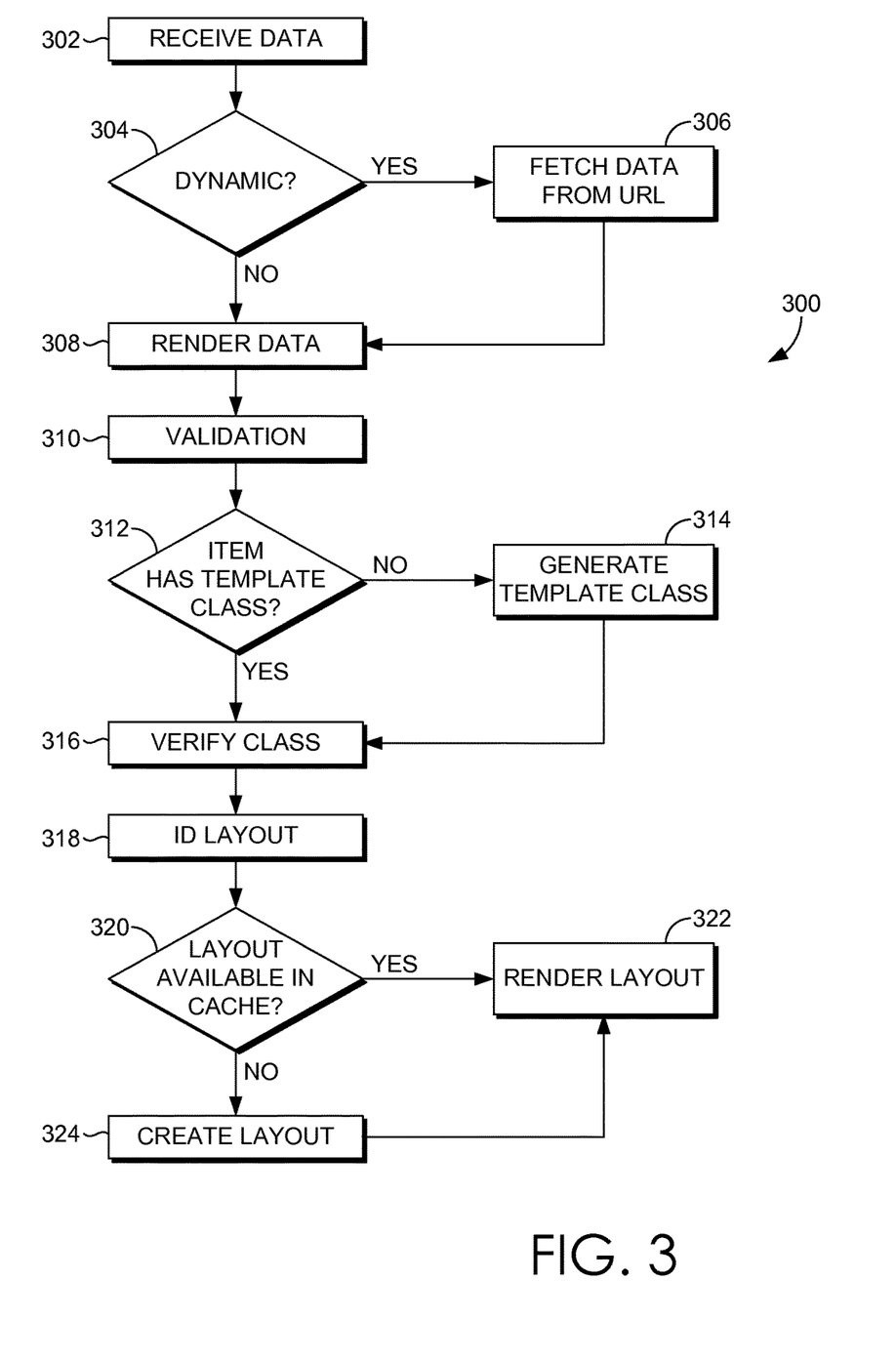
FIG. 3 is a flow diagram of an exemplary process for flexibly displaying content items, in accordance with an embodiment of the present invention.

Turning now to FIG. 3, a process-flow diagram, referenced generally by the numeral 300, is depicted. Initially, data is received at block 302. The data includes one or more content items. A determination of whether the data is dynamic or not is made is block 304. Data may be determined to be dynamic content based on the source of the data. If the source is a source external to the entity coordinating/creating the content cluster, the data may be determined to be dynamic content. If the source is the same entity coordinating/creating the content cluster, the data may be determined to not be dynamic content.

Upon determining the data is dynamic content, the data is received/retrieved from a URL associated with the source of the dynamic content at block 306. Along with the dynamic content being received/retrieved, any properties associated therewith are also received including, but not limited to, a template class. Upon determining the data is not dynamic content, and upon receiving the dynamic content, a response is rendered at block 308.

The data is now ready for validation at block 310. Validation, as previously described, includes validating, among other things, a template class associated with a content item. The template class may indicate whether the content item includes an image or not, a size associated with the image (if present), an orientation associated with the image (if present), whether the content item is a video, and the like.

A determination is made whether the content item is associated with a template class at block 312. As previously mentioned, content items may not be associated with template classes. For example, a source of the content item may have forgotten to associate the content item with a template class. When this occurs, a template class is generated for the content item at block 314. Once a template class is associated with the content item at block 314, or upon determining that the content item was already associated with a template class at block 312, the template class associated with the content item is verified at block 316. This step is important since template classes may be incorrectly associated with content items. An example of an incorrect association is a template class indicating an image is present for a content item that does not include an image. An additional example is a template class indicating an image is present with a portrait orientation when, in fact, the content item includes an image with a landscape orientation.

Once the content within the content item is verified to satisfy the requirements of the associated template class, a layout is identified that corresponds with the template class at block 318. As was previously described, each template class may be associated with one or more templates, or layouts. Thus, a template engine may randomly associate a template for a particular template class with a content item associated with that template class.

Once a layout is identified, a determination is made whether the template is available in the cache at block 320. If the layout is available in the cache, the layout is rendered at block 322. If the layout is not available in the cache, the layout is first created at block 324 and then rendered at block 322.

Figure 4:
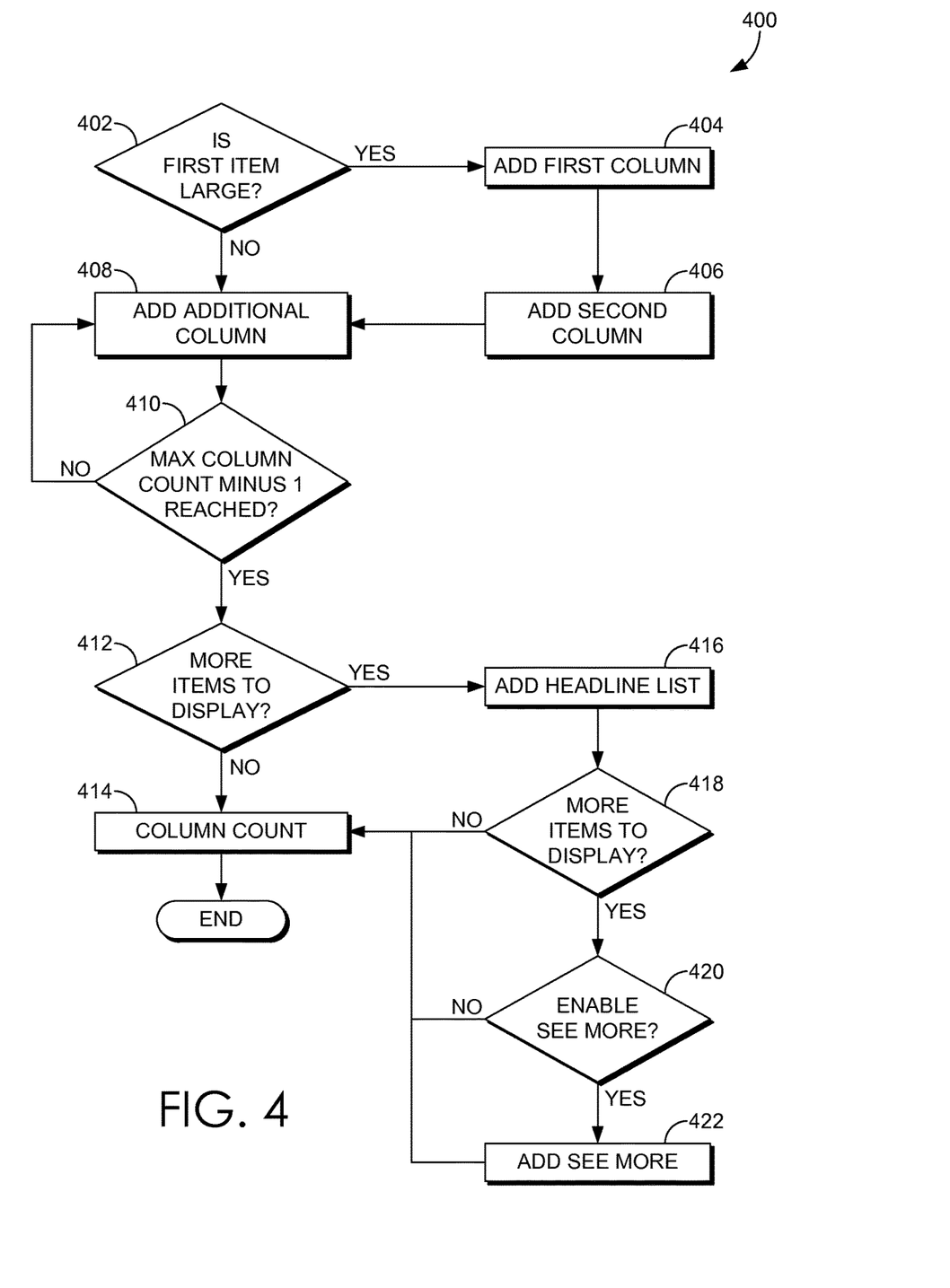
FIG. 4 is a flow diagram of an exemplary process for flexibly displaying content items, in accordance with an embodiment of the present invention.

Turning now to FIG. 4, a process-flow diagram, referenced generally by the numeral 400, is depicted. FIG. 4 provides a detailed look at generating the content cluster. Also, it should be noted that content items discussed in FIG. 4 may have already completed the validation process.

Initially, at block 402, a determination is made whether the first content item is a large content item. A large content item, as used herein, refers generally to a content item including an image of at least a predetermined size. This corresponds with a large template that requires an image of at least a predetermined size. If the first content item is determined to be a large content item, a first item column is added to the content cluster at block 404. This may be seen in FIG. 5 illustrating an exemplary content cluster 500 including a first item column 502. The first column 502, as is shown, includes an image of at least a predetermined size.

Once a first item column 502 including a large template is added, a second column is added at block 406. Again, turning to FIG. 5, a second column is illustrated at block 504. The second column 504 is added based on a remaining screen size after placement of the first item column 502. In embodiments, a second column under a large item template does not include images. FIG. 5 also includes a see more indicator 508. The see more indicator 508 is configured such that, upon selection thereof, additional content items may be displayed to a user.

Figure 7:
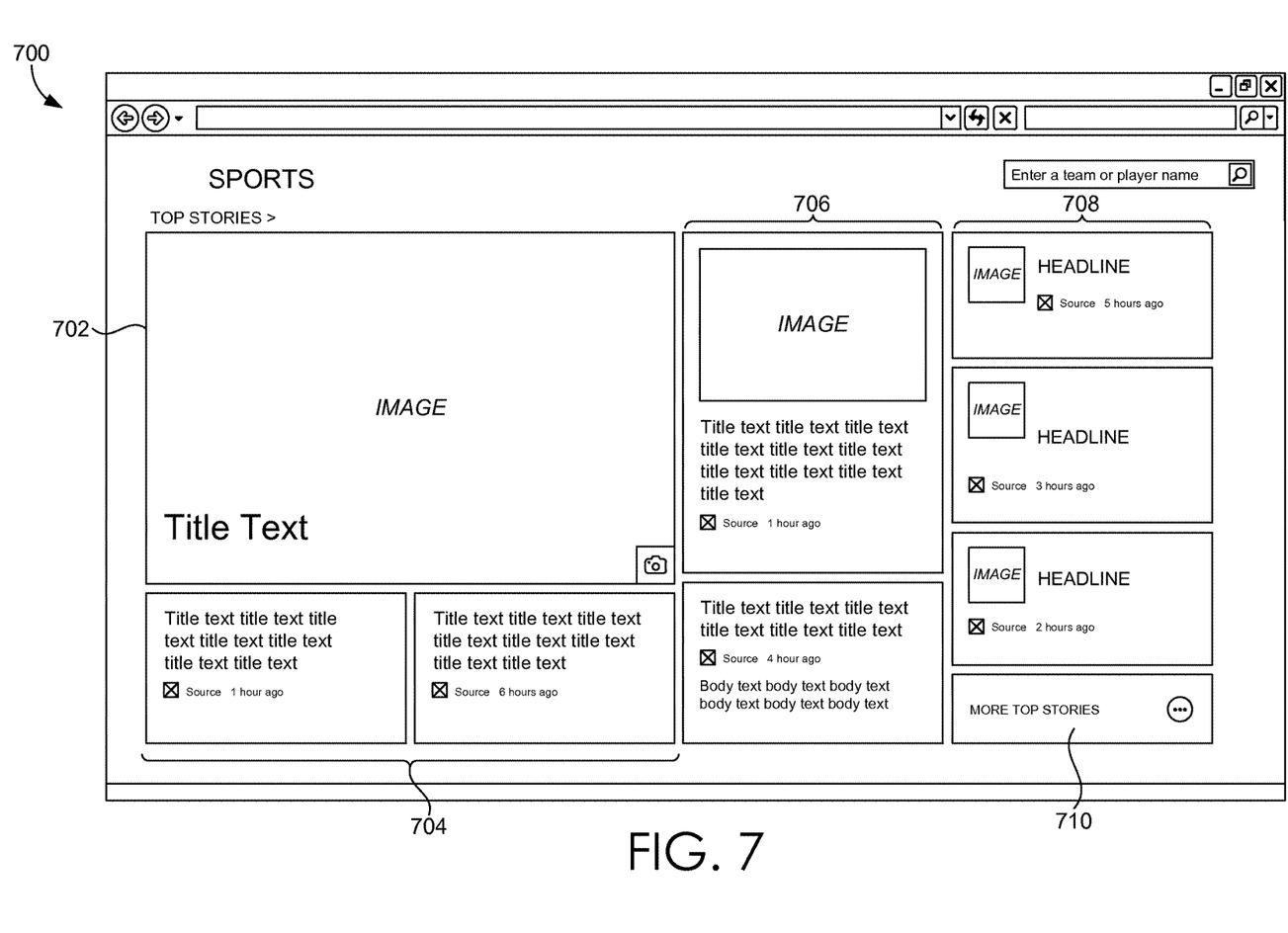

Returning to FIG. 4, once a second column has been added or upon determining that the first content item is not a large content item, an additional column is added at block 408. An additional column, as used herein, refers generally to any columns that are placed between a large item template and a headline column. FIG. 7 illustrates this embodiment. FIG. 7 depicts an illustrative content cluster 700 including a large item template 702, a second column 704, an additional column 706, a headline column 708, and a see more indicator 710. As described with reference to FIG. 5, the second column 704 may be placed according to the remaining screen size relative to the large item template 702. Additional columns may be added to the content cluster 700 until, as illustrated at block 410, a maximum column count minus one is reached. A maximum column count indicates a maximum number of columns that may be present in a content cluster. The placement includes a "minus one" function as a headline column should be included. Thus, when the maximum column count minus one is reached, a headline column should be added.

Returning to FIG. 4, upon determining a maximum column count minus one has not been reached, additional columns may be added at block 408 until an affirmative response is received at block 410. Upon determining that the maximum column count minus one is reached at block 410, a determination is made whether there are more content items to display at block 412. Upon determining there are no more content items to display, a column count is performed at block 414 and the method ends. Upon determining there are more content items to display, a headline column is added at block 416 including one or more content items. A determination is then made at block 418 whether there are still more content items to display. Upon determining there are no more content items to display at block 418, a column count is performed at block 414 and the method ends. Upon determining there are more items to display at block 418, a determination is made whether a see more indicator is enabled at block 420. If the see more indicator is not enabled at block 420, a column count is performed at block 414 and the method ends. If the see more indicator is enabled at block 420, a see more indicator is added to the content cluster at block 422, a column count is performed at block 414, and the method ends.

Figure 6:
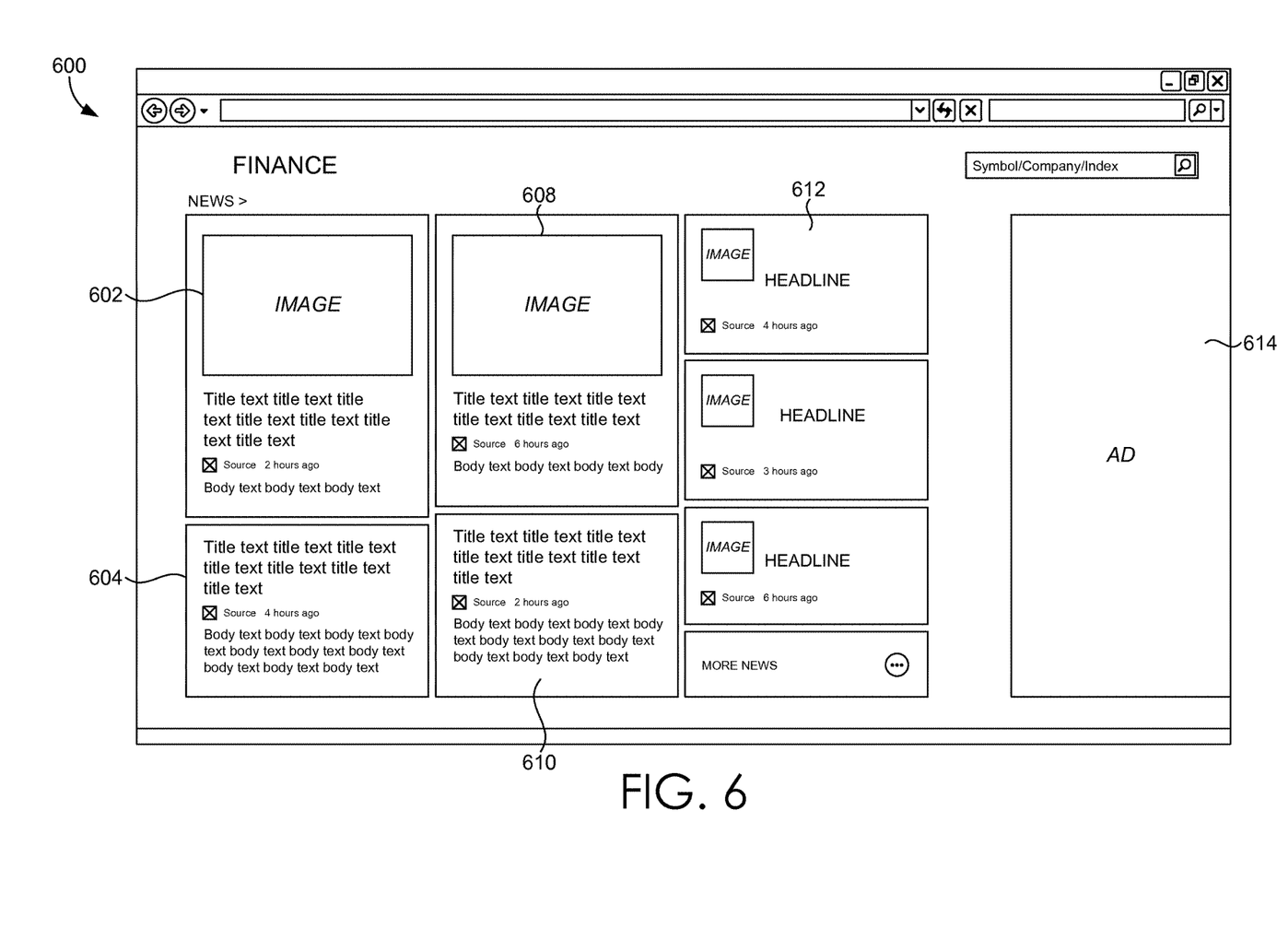

Continuing on with FIG. 6, an exemplary content cluster 600 is provided. The content cluster 600 includes four templates, template 602, template 604, template 608, and template 610 that are each arranged according to remaining screen size. A headline column 612 is included. An advertisement 614 is also presented in content cluster 600. Advertisements may be displayed in content clusters after a specified number of columns.

Figure 8:
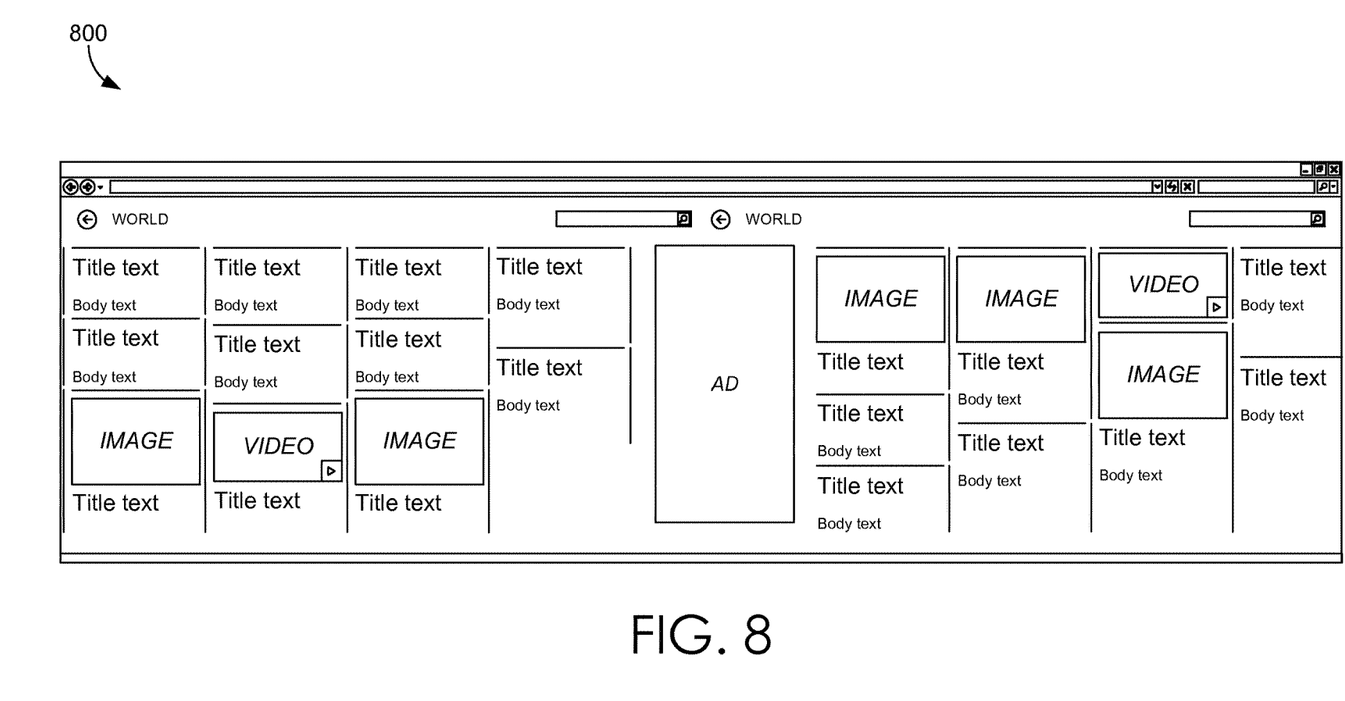

Turning now to FIG. 8, an illustrative content cluster 800 is provided. The content cluster 800 of FIG. 8 is an exemplary expanded content cluster. As is illustrated, a large number of columns is present in the expanded content cluster, along with one or more advertisements.

Figure 9:
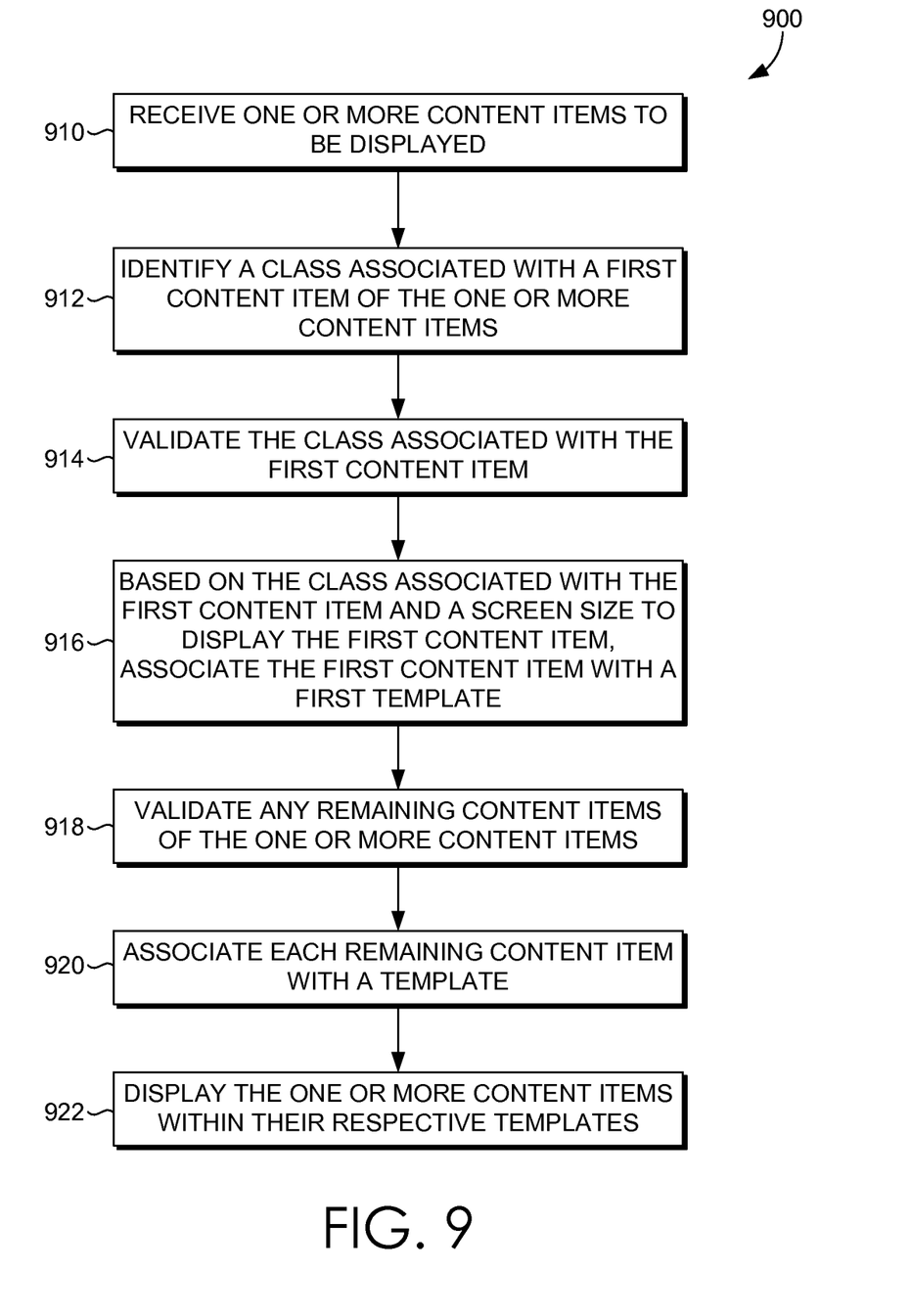
FIG. 9 is a flow diagram of an exemplary method of process for flexibly displaying content items, in accordance with an embodiment of the present invention.

FIG. 9 is a flow diagram of an exemplary method 900. At block 910, one or more content items to be displayed are received. A class associated with a first content item of the one or more content items is identified at block 912. The class is validated at block 914. Based on the class associated with the first content item and a screen size to display the first content item, a first template is associated with the first content item at block 916. Any remaining content items of the one or more content items are validated at block 918 and each remaining content item is associated with a template at block 920. The one or more content items are displayed at block 922.

Figure 10:
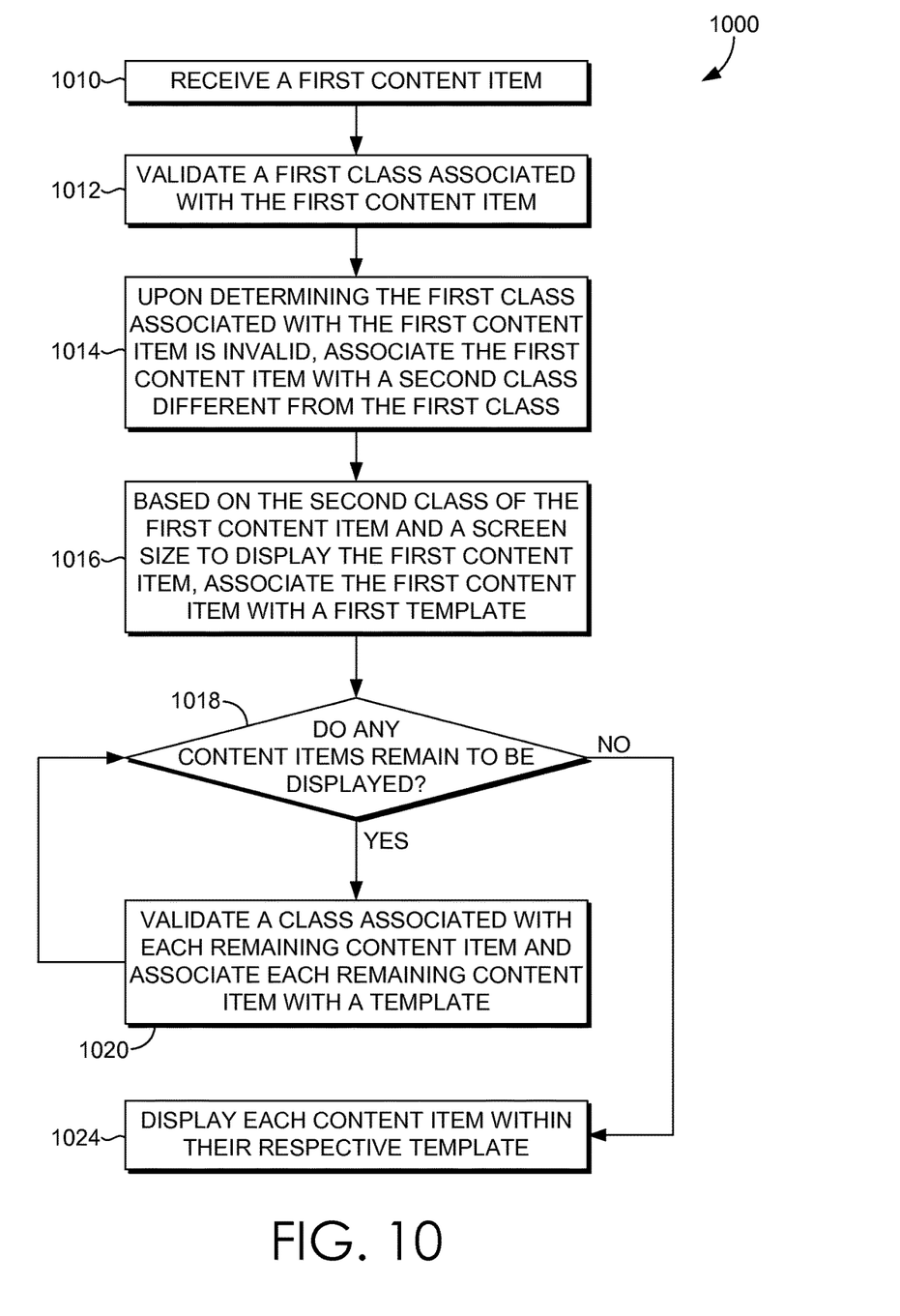
FIG. 10 is a flow diagram of an exemplary method of process for flexibly displaying content items, in accordance with an embodiment of the present invention.

FIG. 10 is a flow diagram of an exemplary method 1000. At block 1010, a first content item is received. A first class associated with the first content item is validated at block 1012. Upon determining the first class associated with the first content item is invalid, the first content item is associated with a second class different than the first class at block 1014. Based on the second class of the first content item and a screen size to display the first content item, the first content item is associated with a first template at block 1016. A determination is made whether any content items remaining to be displayed at block 1018. If there are no content items remaining to be displayed, each content item is displayed in a content cluster within their respective template at block 1024. If there are content items remaining to be displayed, a class associated with each content item remaining to be displayed is validated and each remaining content item is associated with a template at block 1020. The determination is then made again whether there are any remaining content items to be displayed at block 1018 until there are no more content items remaining to be displayed.

Figure 11:
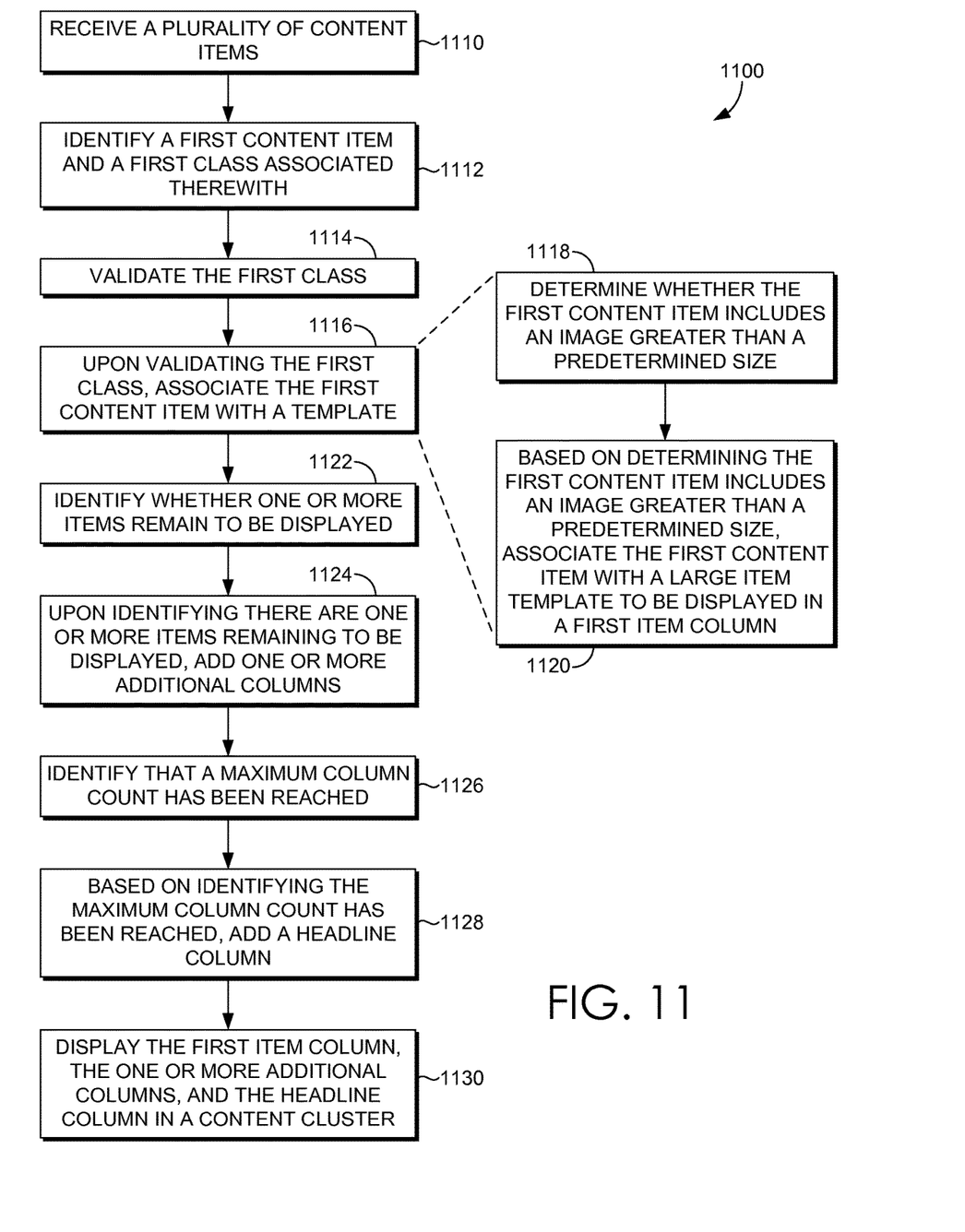
FIG. 11 is a flow diagram of an exemplary method of process for flexibly displaying content items, in accordance with an embodiment of the present invention.

FIG. 11 is a flow diagram of an exemplary method 1100. At block 1110, a plurality of content items is received. A first content item is identified as well as a first class associated therewith at block 1112. The first class is validated at block 1114 and, upon validating the first class, the first content item is associated with a template at block 1116. Associating the first content item with a template includes determining whether the first content item includes an image greater than a predetermined size at block 1118 and, if so, associating the first content item with a large item template to be displayed in a first item column at block 1120. It is then identified whether one or more content items remain to be displayed at block 1122. If there is one or more content items remaining to be displayed, one or more additional columns is added at block 1124. At block 1126 it is identified that a maximum column count has been reached, wherein the maximum column count is a maximum number of columns available minus one. At block 1128, a headline column is added and the first item column, the one or more additional columns, and the headline column are displayed in a content cluster at block 1130.

The present invention has been described in relation to particular embodiments, which are intended in all respects to be illustrative rather than restrictive. Alternative embodiments will become apparent to those of ordinary skill in the art to which the present invention pertains without departing from its scope.

What is claimed is:

1. One or more computer-storage media having computer-executable instructions embodied thereon that, when executed by one or more computing devices, perform a method, the method comprising:
    receiving one or more content items to be displayed, wherein each content item is received with an assigned template class;
    identifying the template class assigned to a first content item of the one or more content items, wherein the template class is associated with a plurality of corresponding templates, and wherein the template class identifies specific properties of the first content item;
    validating the template class assigned to the first content item by verifying that the specific properties identified by the template class are fulfilled by the first content item;
    responsive to successfully validating the template class, and based on the template class assigned to the first content item and a screen size to display the first content item, associating the first content item with a first template from the plurality of templates that correspond to the template class;
    validating any remaining content items of the one or more content items;
    associating each remaining content item with a template; and
    displaying the one or more content items within their respective templates in a content cluster.

2. The media of claim 1, wherein the first content item is a dynamic content item.

3. The media of claim 2, wherein the dynamic content item is content received from a source external to a source displaying the content cluster.

4. The media of claim 1, wherein a property of a content item indicates whether an image is present in the content item.

5. The media of claim 4, wherein the property of the content item indicates an image size of an image present in the content item.

6. The media of claim 4, wherein the property of the content item indicates an orientation of an image present in the content item.

7. A computerized method, the method comprising:
    receiving a first content item, wherein the first content item is received with an assigned first template class, wherein the first template class comprises an identifier that indicates specific properties of the first content item, and wherein the specific properties indicated by the template class comprise whether an image is present in the content, a size of the image when present, and an orientation of the image when present;
    validating the first template class assigned to the first content item by determining whether the specific properties indicated by the first template class are fulfilled by the first content item;
    upon determining that the specific properties indicated by the first template class are not fulfilled by the first content item, wherein the first template class assigned to the first content item is invalid, assigning the first content item a second template class different from the first template class;
    based on the second template class assigned to the first content item and a screen size to display the first content item, associating the first content item with a first template that is selected from a plurality of templates that correspond to the second template class;
    determining whether any content items remain to be displayed;
    based on determining there is at least one content item remaining to be displayed, validating a template class associated with each remaining content item and associating each remaining content item with a template;
    determining whether any content items remain to be displayed; and
    upon determining there are no content items remaining to be displayed, displaying each content item within their respective template in a content cluster.

8. The method of claim 7, wherein a template class indicates whether an image included within a content item is a portrait orientation or a landscape orientation.

9. The method of claim 7, wherein a template class indicates a size of an image within a content item.

10. The method of claim 7, wherein the first content item is a dynamic content item.

11. The method of claim 10, wherein the dynamic content item is content received from a source external to a source displaying the content cluster.

12. The method of claim 7, wherein the content cluster is a display of a plurality of content items within their respective templates.

13. The method of claim 7, further comprising assigning any remaining content items to be displayed to templates based at least on a remaining screen size with respect to the first template.

* * * * *